(12) United States Patent
Costa

(10) Patent No.: US 9,081,646 B2
(45) Date of Patent: Jul. 14, 2015

(54) BUILDING PACKAGES OF FUNCTIONALLY DIFFERENT PROGRAMS FROM SOURCE CODE OF A SINGLE PROGRAM

(75) Inventor: Glauber Costa, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 1181 days.

(21) Appl. No.: 12/692,388

(22) Filed: Jan. 22, 2010

(65) Prior Publication Data

US 2011/0185352 A1 Jul. 28, 2011

(51) Int. Cl.
*G06F 9/445* (2006.01)
*G06F 9/44* (2006.01)

(52) U.S. Cl.
CPC ........................................ *G06F 8/71* (2013.01)

(58) Field of Classification Search
CPC ...... G06F 9/44505; G06F 9/4411; G06F 8/65
USPC ......................................................... 717/174
See application file for complete search history.

(56) References Cited

U.S. PATENT DOCUMENTS

| 7,539,976 | B1 * | 5/2009 | Ousterhout et al. | 717/120 |
| 8,302,108 | B1 * | 10/2012 | Hurren et al. | 719/320 |
| 2004/0059703 | A1 * | 3/2004 | Chappell et al. | 707/1 |
| 2007/0078988 | A1 * | 4/2007 | Miloushev et al. | 709/227 |
| 2008/0022269 | A1 * | 1/2008 | Diedrich et al. | 717/145 |
| 2008/0184196 | A1 * | 7/2008 | Kataoka | 717/107 |
| 2008/0201705 | A1 * | 8/2008 | Wookey | 717/175 |
| 2009/0100404 | A1 * | 4/2009 | Chaturvedi et al. | 717/101 |
| 2010/0131926 | A1 * | 5/2010 | Younce et al. | 717/122 |
| 2010/0146483 | A1 * | 6/2010 | Komarov et al. | 717/120 |
| 2010/0287290 | A1 * | 11/2010 | Bramley et al. | 709/229 |
| 2012/0210312 | A1 * | 8/2012 | Ma et al. | 717/170 |

OTHER PUBLICATIONS

Protti, D. J. (2009). Linux KVM as a learning tool. Linux Journal, 2009(186), 3.*
Proceedings of the Linux Symposium, vol. One, Jun. 27-30, 2007, Ottawa, Ontario, Canada, Muli Ben-Yehuda et al., IBM Haifa Research Lab, muli@il.ibm.com.*

* cited by examiner

*Primary Examiner* — Li B Zhen
*Assistant Examiner* — Arshia S Kia
(74) *Attorney, Agent, or Firm* — Lowenstein Sandler LLP

(57) ABSTRACT

Build-result packages are created for functionally different programs from a source code package of a single program.

11 Claims, 5 Drawing Sheets

BUILDING PACKAGES OF FUNCTIONALLY DIFFERENT PROGRAMS FROM SOURCE CODE OF A SINGLE PROGRAM

TECHNICAL FIELD

Embodiments of the present invention relate to building software packages. Specifically, embodiments of the invention relate to a method and system for building packages of functionally different programs from source code of a single program.

BACKGROUND

When a software program is being created, a programmer typically writes source code at a level that may be read and understood by other humans. The source code is then fed to a compiler. The compiler transforms the source code into an executable file. The executable file is usually in a machine language that can not be easily understood by humans but that can be quickly digested by a processor of a computer. With a larger software program, several programmers may work together to create the code pieces that are used to ultimately produce the large software program. In more general terminology, the programmers create original files. The original files are then fed to a build system that manipulates them to produce build-result files or packages. These build-result packages are typically capable of being directly consumed by a processing device.

Programmers often provide bug fixes and security updates for programs, causing the build system to recreate relevant build-result packages. A program's source code can include portions applicable to specific versions of the program. For example, source code of an operating system can include portions applicable to operating system versions for different hardware platforms. The build system can use a single package containing source code of different operating system versions to create multiple build-result packages, with each build-result package corresponding to an operating system version operable with a distinct hardware platform. Combining the source code of different operating system versions into a single source code package significantly simplifies maintenance of source code packages. However, source code of functionally different programs is still maintained in separate packages even if these programs share a significant amount of source code. As a result, when fixes or updates are received for one program, they have to be propagated not only to this program but also to a program with which it has shared source code.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for building packages of functionally different programs from source code of a single program are described herein. In one embodiment, a source code package of a first program is stored in a source code store. The source code package of the first program includes source code of a second program, where the first program and the second program are two functionally different programs. For example, the first and second programs may be designated to run in different spaces (e.g., in a user space and in a kernel space), be intended for different business applications, or be associated with two different open source or proprietary projects. In one specific example, the first program is a kernel-based virtual machine (KVM) program and the second program is a quick emulator (QEMU) program that can be run on a server hosting multiple virtual machines.

A build system creates a build-result package of the first program from the source code of the first program, and creates a build-result package of the second program from the source code of the first program. Subsequently, when the build system receives updates or fixes for one of the two programs, these updates or fixes are propagated to the source code of the first program, and the build-result packages are re-created from the updated source code of the first program. Accordingly, maintenance of both programs becomes easier and involves much less work.

Figure 1:
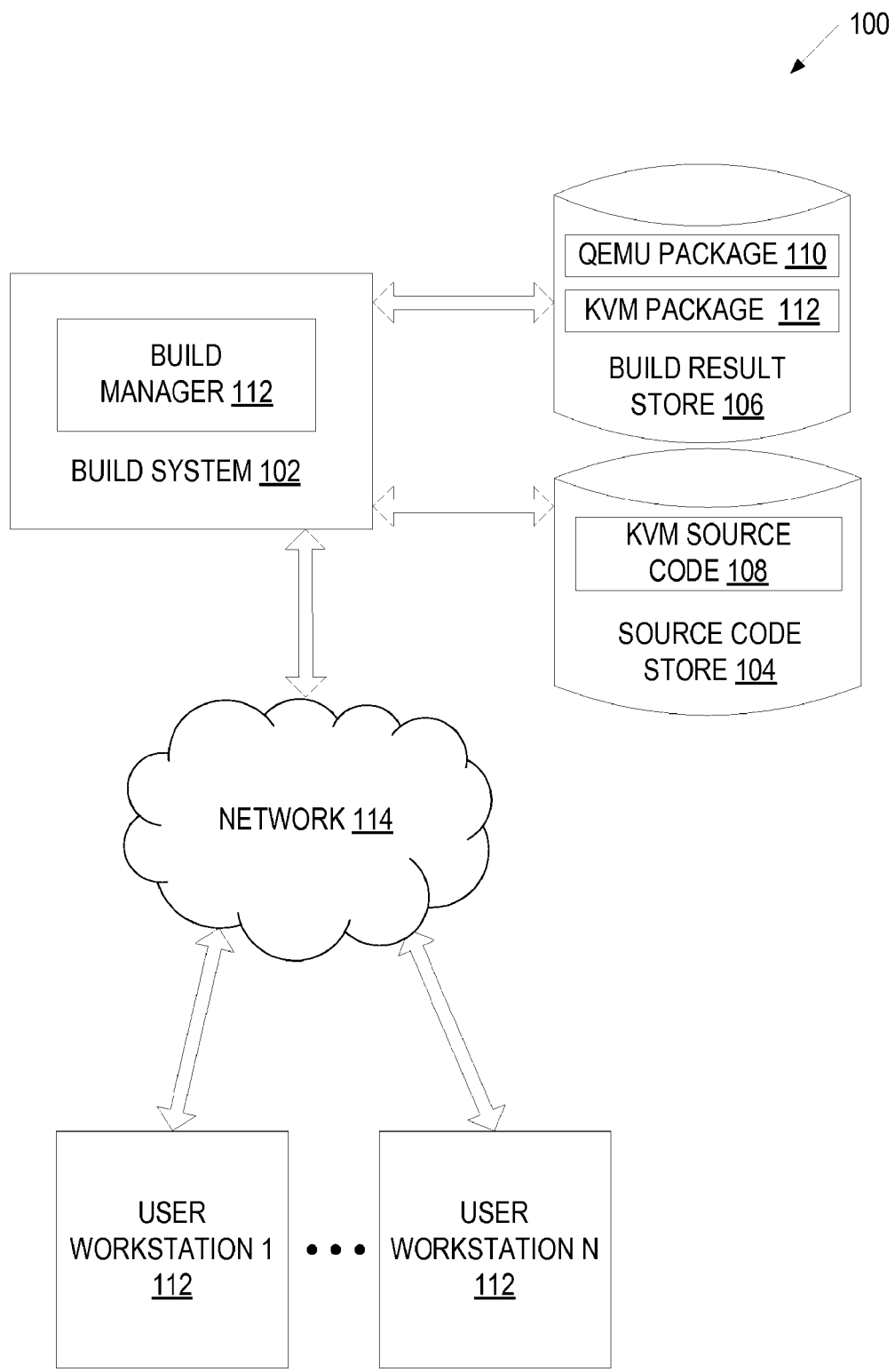
FIG. 1 illustrates an exemplary network architecture in which embodiments of the invention may operate.

FIG. 1 illustrates an exemplary network architecture 100 in which embodiments of the invention may operate. The architecture 100 includes a build system 102 coupled to multiple user workstations 112 via a network 114. A user workstation 112 may be a client computing system such as a personal computer, a laptop, a PDA, a mobile phone, etc. The build system 102 may be hosted by one or more servers such as server computers, gateway computers, etc. The network 114 may be a public network (e.g., Internet) or a private network (e.g., a local area network (LAN)).

Users of workstations 112 may be programmers that provide source code of various programs and subsequently provide fixes (e.g., bug fixes) and updates (e.g., security updates) for these programs. The source code of various programs is stored in a source code store 104 that may be a database, a repository or any other data structure, and may reside on one or more data storage devices. These data storage devices may be composed of one or more types of removable storage and/or one or more types of non-removable storage. The source code store 104 may reside on the same machine as the build system 102 or on a separate machine(s) connected to the build system 102 directly or via a network (e.g., public or private network).

In one embodiment, the source code store 104 includes a source code package of a first program, where the source code of the first program contains source code of a second program. In one embodiment, the source code package of the first program contains all the source code of the second program. In another embodiment, the source code package of the first program contains most of the source code of the second program or the most relevant part of the source code of the second program.

The source code of the second program may be stored in one or more designated directories of the first program's source code package or in the same directory or directories as all or some of the source code of the first program. The source code of the second program provides full functionality for the second program (e.g., command line options, help files, firmware files, etc.), and therefore is not suitable for a separate library usage. The first program and the second program are two functionally different programs. For example, the first and second programs may be designated to run in different spaces (e.g., in a user space and in a kernel space), be intended for different business applications, or be associated with two different open source or proprietary projects or be designated to run in different spaces (e.g., in a user space and in a kernel space). For example, in the Open Source community it is common practice for a group of developers to diverge from the main group, creating a "fork," i.e., a second program that is heavily based on the first one.

In the illustrated example, the first program is a KVM program and the second program is a QEMU program that can be run on a server hosting multiple virtual machines. The KVM source code package 108 includes source code of the QEMU program.

The QEMU program ("QEMU") provides a processor and system emulator which enables users to launch virtual machines not only under the same hardware platform as the host machine, but also dramatically different hardware platforms. For example, QEMU can be used to run a power PC (PPC) or a scalable processor architecture (SPARC) guest operating system on a x86 host. QEMU dynamically translates the machine code of the guest architecture into the machine code of the host architecture. The KVM program ("KVM") provides kernel support for running guest operating systems of the same architecture as the host. Guests run directly on the hardware without any translation needed by the host, allowing much higher levels of performance to be attained. QEMU can use the KVM kernel support for higher performance virtualization.

In one embodiment, the build system 102 includes a build manager 112 that creates a build-result package 110 of the QEMU program and a build-result package 112 of the KVM program using a single source code package (e.g., the KVM source code package 108). In an alternative embodiment, in which the source code package of KVM contains most of the source code of QEMU or the most relevant part of the source code of QEMU, a pre-processing step adding the remaining source code of QEMU is performed prior to building the QEMU build-result package 110. The QEMU build-result package 110 and the KVM build-result package 112 are stored in a build-result store 106 that may be a database, a repository or any other data structure, and may reside on one or more data storage devices. These data storage devices may be composed of one or more types of removable storage and/or one or more types of non-removable storage. The build-result store 106 may reside on the same machine as the build system 102 or on a separate machine(s) connected to the build system 102 directly or via a network (e.g., public or private network). The QEMU build-result package 110 and the KVM build-result package 112 may then be distributed to different machines for installation. In particular, both packages may distributed to one or more virtual machine hosts to run together on the same machine. Alternatively, the packages 110 and 112 may be distributed to different machines that will run only one of the two programs.

Subsequently, when users of workstations 112 send fixes or updates for KVM or QEMU, the build manager 112 propagates these fixes or updates to the KVM source code package 108, rebuilds the QEMU build-result package 110 and the KVM build-result package 112, and stores the rebuilt packages in the build-result store 106.

It should be noted that the KVM and QEMU programs are used for illustration only. In fact, various other functionally different programs can be used with embodiments of the present invention without loss of generality. In addition, the network architecture 100 is not required for the embodiments of the present invention. In particular, the build system 102 may be part of a user workstation 112 and can provide the same functionality as that discussed herein.

Figure 2:
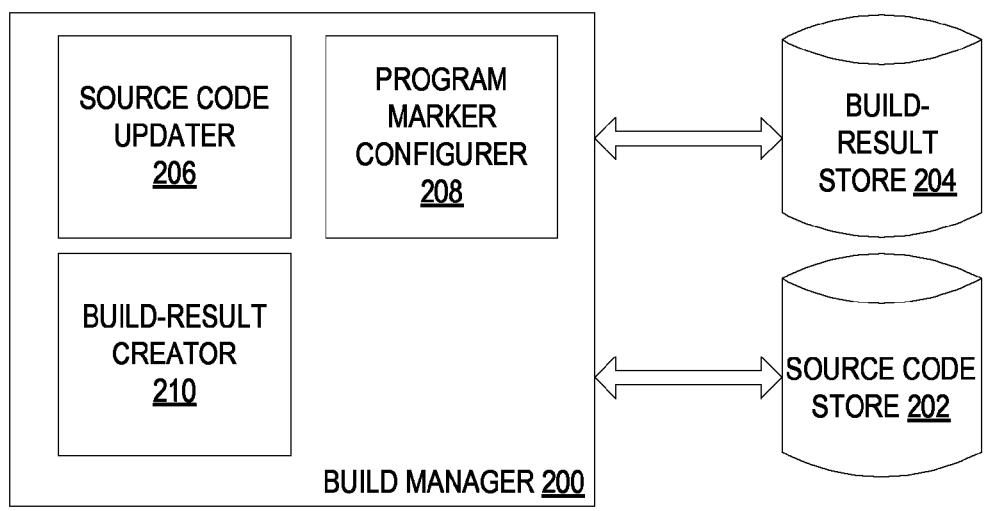
FIG. 2 is a block diagram of one embodiment of a build manager.

FIG. 2 is a block diagram of one embodiment of a build manager 200. The build manager 200 may be the same as build manager 112 of FIG. 1. The build manager 200 includes a source code updater 206, a program marker configurer 208 and a build-result creator 210.

The source code updater 206 receives source code packages of different programs and stores them in a source code store 202. In addition, the source code updater 206 receives fixes and updates for various programs and propagates them to corresponding source code packages in the store 202.

The build-result creator 210 creates build-result packages for various programs from relevant source code packages in the source code store 202, and stores the build-result packages in a build-result store 204. The build-result packages may be in an RPM package manager (RPM) format or any other format. The build-result creator 210 may create a build-result package in response to a user request (e.g., a via a command line interface or GUI provided by the build manager 200) or automatically upon receiving a corresponding source code package. For a source code package combining source code of two functionally different programs (e.g., QEMU and KVM), the user request may identify a source code package (e.g., KVM source code package), and the build-result creator 210 may first create a build-result package for a first program from the specified source code package and then a build-result package for a second program from the specified source code package in a predefined order. Alternatively, the user request may specify a program (e.g., KVM), and the build-result creator 210 can identify an appropriate source code package (e.g., KVM source code package) and then create a build-result package for the specified program from the identified source code package. Yet alternatively, if the build-result creator 210 creates build-result packages automatically upon receiving a corresponding source code package (e.g., KVM source code package), the build-result creator 210 first creates a build-result package for a first program from the received source code package and then a build-result package for a second program from the received source code package in a predefined order.

When the source code updater 206 propagates updates or fixes to a source code package (e.g., KVM source code package), the source code updater 206 can invoke the build-result creator 210 to re-build the KVM build-result package and the QEMU build result package from the updated KVM source code package. Alternatively, the build-result creator 210 can re-build any or both of the KVM build-result package and the QEMU build-result package from the updated KVM source code package upon receiving a request from the user.

In one embodiment, prior to creating a QEMU or KVM build-result package, the build-result creator 210 invokes the program marker configurer 208 to prepare the source code of KVM. In particular, depending on whether a build-result package should be created for QEMU or KVM, the program marker configurer 208 can either disable or enable markers associated with QEMU in the KVM source code. A marker may identify a directory or file designated for QEMU source code. Alternatively, a marker may be a pre-processor macro that tags source code of QEMU.

In some embodiments, rather than creating a single QEMU package from the KVM source code package, the build-result creator 210 creates multiple sub-packages providing different functionality. For example, the build-result creator 210 can create a sub-package for each group of target computer architectures (e.g., qemu-system-x86, qemu-system-ppc, qemu-system-sparc, etc.), a qemu-user sub-package containing various user mode emulators, a qemu-common package containing BIOS binaries, documentation and the like, etc. In addition, a qemu-kvm sub-package can be created for the KVM program. A qemu meta-package can be used to automatically install of the QEMU sub-packages.

Figure 3:
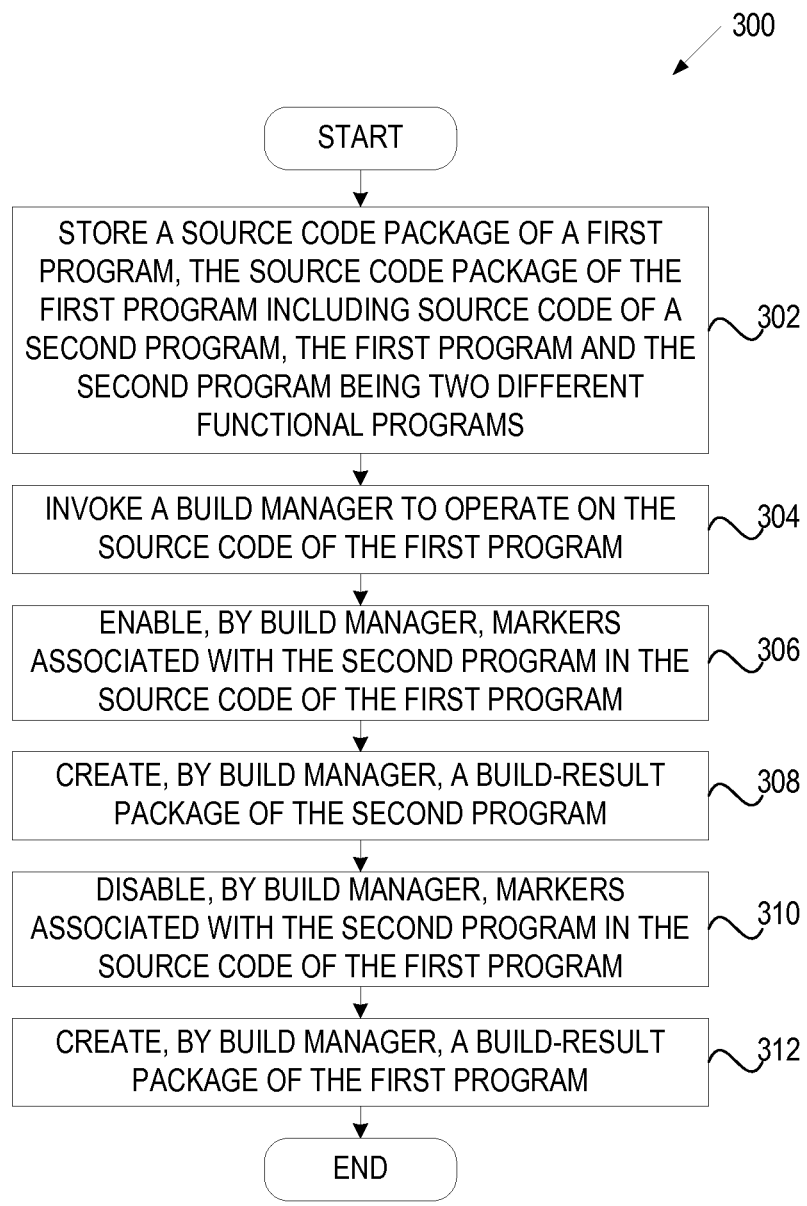
FIG. 3 is a flow diagram of one embodiment of a method for creating build-result packages for functionally different programs using source code of a single program.

FIG. 3 is a flow diagram of one embodiment of a method 300 for creating build-result packages for functionally different programs using source code of a single program. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a build system (e.g., build system 102 of FIG. 1).

Referring to FIG. 3, method 300 begins with storing a source code package of a first program in a source code store. The source code package of the first program includes source code of a second program, where the first program and the second program are two different functional programs. For example, the first and second programs may be associated with two different open source or proprietary projects or be designated to run in different spaces (e.g., in a user space and in a kernel space). In one specific example, the first program is a KVM program and the second program is a QEMU program, and the KVM source code package includes source code of the QEMU program.

At block 304, processing logic invokes a build manager to access the source code package of the first program (e.g., the KVM source code package). The build manager may be invoked automatically upon receiving the source code package of the first program, or in response to a user request specifying the source code package of the first program or specifying the first program (e.g., KVM) or the second program (e.g., QEMU) for which a build-result package should be created.

At block 306, the build manager enables markers associated with the second program in the source code package of the first program. The markers may identify one or more directories or files designated to the second program or pre-processor macros tagging the second program.

At block 308, the build manager creates a build-result package of the second program from the source code package of the first program, and stores the build-result package of the second program in a build-result data store. The build-result package of the second program may be in the RPM format or any other packaging format.

At block 310, the build manager disables markers associated with the second program in the source code package of the first program. The build manager may disable the markers associated with the second program in response to a user request specifying the first program for which a build-result package should be created. Alternatively, the build manager may disable the markers associated with the second program automatically (i.e., without user interaction) upon finishing the creation of the build-result package of the second program. Yet alternatively, the build manager first creates a build-result package of the first program and then creates a build-result package of the second program.

After disabling the markers associated with the second program, the build manager creates a build-result package of the first program from the source code package of the first program (block 312) and stores the build-result package of the first program in the build-result store.

Figure 4:
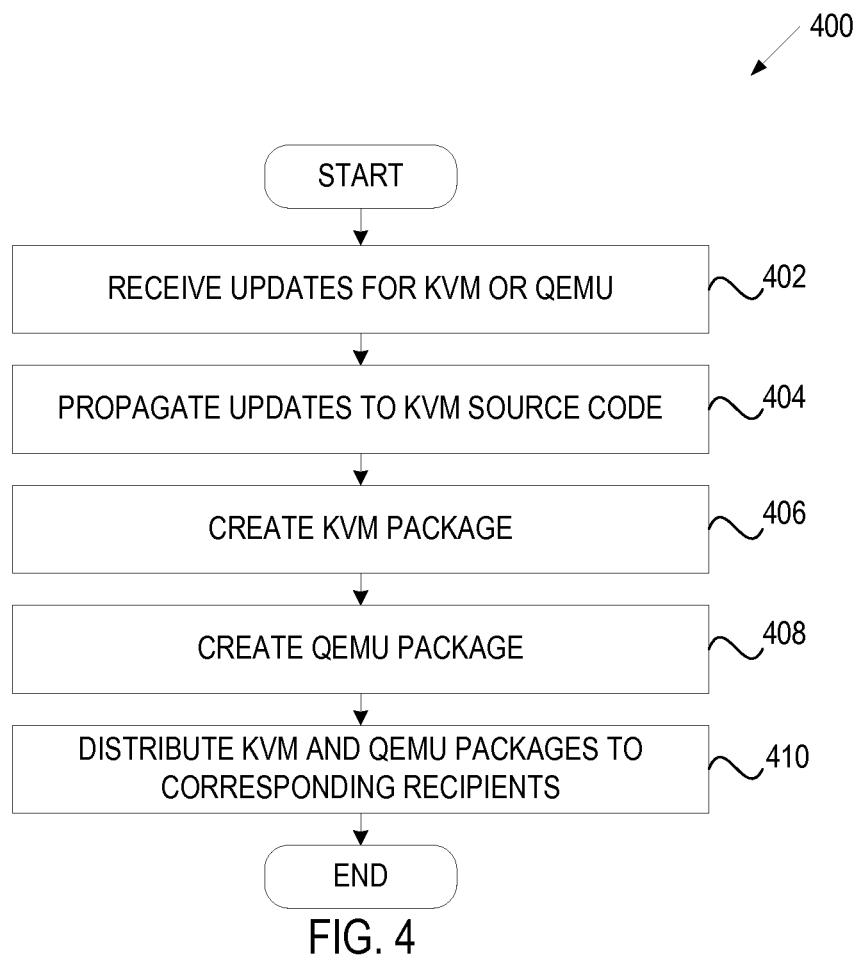
FIG. 4 is a flow diagram of one embodiment of a method for maintaining packages of functionally different programs that have shared source code.

FIG. 4 is a flow diagram of one embodiment of a method 400 for maintaining packages of functionally different programs that have shared source code such as QEMU and KVM programs. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a build system (e.g., build system 102 of FIG. 1).

Referring to FIG. 4, method 400 begins with processing logic receiving updates for KVM or QEMU. At block 404, processing logic propagates updates to the KVM source code package. At block 406, processing logic creates a KVM built-result package from the updated KVM source code package. At block 408, processing logic creates a QEMU built-result package from the updated KVM source code package. At block 410, processing logic distributes the KVM and QEMU build-result packages to corresponding machines for installation.

Figure 5:
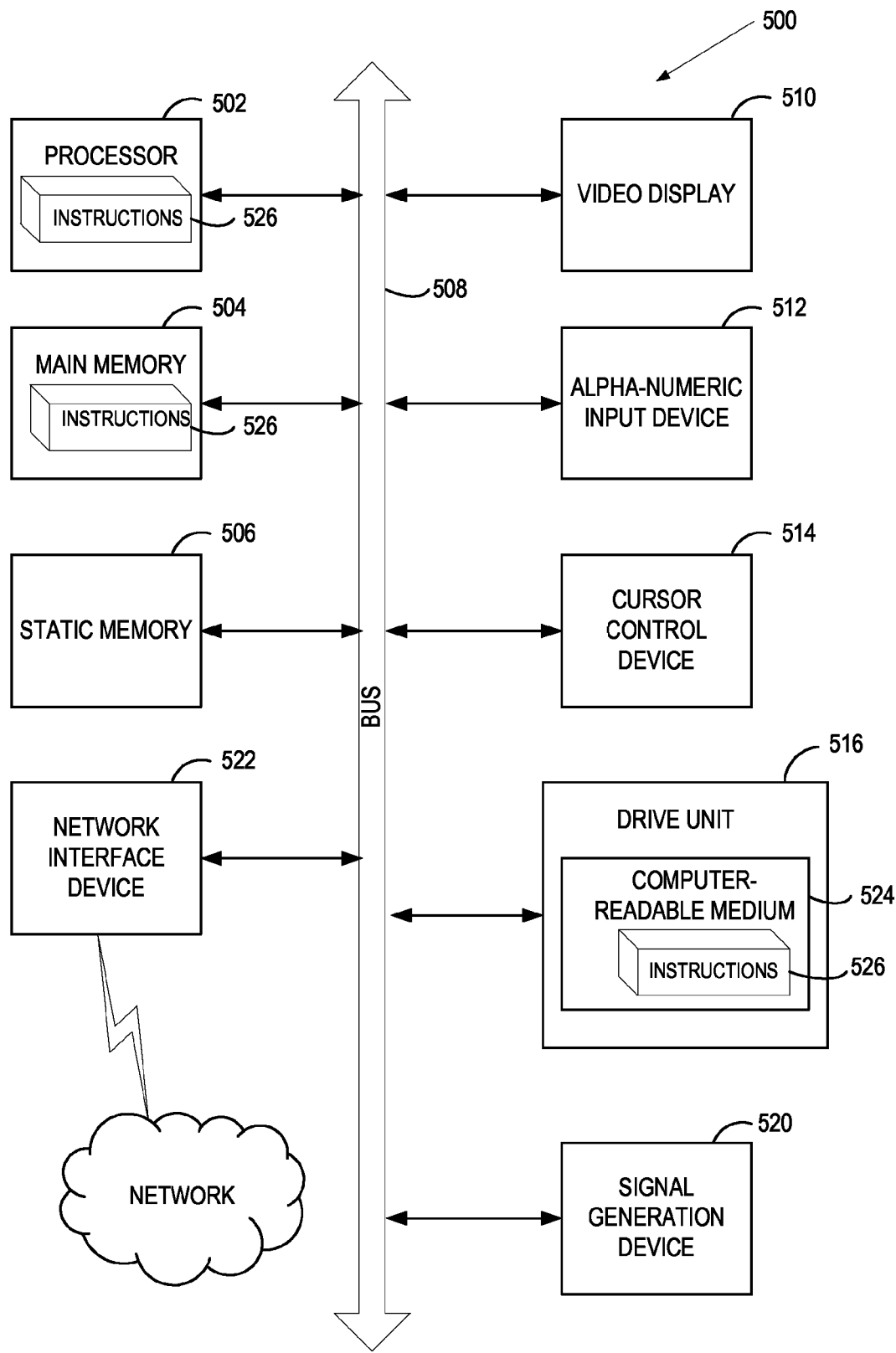
FIG. 5 is a block diagram of one embodiment of a build system.

FIG. 5 is a block diagram of one embodiment of a build computer system. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server machine or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes one or more processing devices 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing devices 502 represent one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more specialpurpose processing devices such as an application specific integrated circuit (ASIC), a field programmable gate array (FPGA), a digital signal processor (DSP), network processor, or the like. Processing device 502 is configured to execute instructions 526 (e.g., build manager 112 of FIG. 1) for performing the operations and steps discussed herein.

The computer system 500 may further include a network device 110 (e.g., NIC, Ethernet network card, etc.). The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., build manager 112 of FIG. 1) embodying any one or more of the methodologies or functions described herein. The instructions 526 (e.g., build manager 112 of FIG. 1) may also reside, completely or at least partially, within the main memory 504 and/or within the processing device 502 during execution thereof by the computer system 500, the main memory 504 and the processing device 502 also constituting machine-readable storage media. The instructions 526 (e.g., build manager 112 of FIG. 1) may further be transmitted or received over a network 518 via the network device 110.

The computer-readable storage medium 524 may also be used to store the instructions 526 (e.g., build manager 112 of FIG. 1) persistently. While the computer-readable storage medium 526 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "creating," "returning," "providing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for creating build-result packages of functionally different programs from a source code package of a single program has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   storing a source code package of a first program in a source code data store, the first program designated to run in a kernel space;
   determining, by a processing device of a computing system, that the source code package of the first program includes source code of a second program designated to run in a user space, the source code of the second program being identified by markers in the source code package of the first program, the first program and the second program being two functionally different programs;
   creating, from the source code of the first program, by a build manager on the computing system, a build-result package of the first program using disabled markers associated with the second program in the source code package of the first program, the build-result package of the first program to run in the kernel space; and
   creating, from the source code of the first program, by the build manager, a build-result package of the second program using enabled markers associated with the second program in the source code package of the first program, the build-result package of the second program to run in the user space, wherein the build-result package of the first program and the build-result package of the second program are executable by the processing device independent of each other.

2. The method of claim 1 wherein the first program is a kernel-based virtual machine (KVM) program, and the second program is a quick emulator (QEMU) program.

3. The method of claim 1 wherein each marker corresponds to a specific directory, a specific file or a pre-processor macro.

4. The method of claim 1 further comprising:
   receiving updates for the second program;
   propagating the updates to the source code package of the first program;
   recreating the build-result package of the first program; and
   recreating the build-result package of the second program.

5. The method of claim 1 wherein creating, by the build manager on the computing system, the build-result package of the first program from the source code of the first program comprises:
   creating a plurality of build-result sub-packages for the second program.

6. A system comprising:
   a data storage device to store a source code package of a first program in a source code data store, the first program designated to run in a kernel space;
   a processing device of the computing system, coupled to the data storage device; and
   a build system, executed by the processing device from the data storage device, to determine that the source code package of the first program includes source code of a second program designated to run in a user space, the source code of the second program being identified by markers in the source code package of the first program, the first program and the second program being two functionally different programs; to create, from the source code of the first program, build-result package of the first program using disabled markers associated with the second program in the source code package of the first program, the build-result package of the first program to run in the kernel space; and to create, from the source code of the first program, a build-result package of the second program using enabled markers associated with the second program in the source code package of the first program, the build-result package of the second program to run in the user space, wherein the build-result package of the first program and the build-result package of the second program are executable by the processing device independent of each other.

7. The system of claim 6 wherein the first program is a kernel-based virtual machine (KVM) program, and the second program is a quick emulator (QEMU) program.

8. The system of claim 6 wherein each marker corresponds to a specific directory, a specific file or a pre-processor macro.

9. The system of claim 6 wherein the build system is further to receive updates for the second program, to propagate the updates to the source code package of the first program, to recreate the build-result package of the first program, and to recreate the build-result package of the second program.

10. A non-transitory computer readable storage medium comprising instruction, which when executed by a computing system, cause the computing system to perform a method comprising:
    storing a source code package of a first program in a source code data store, the first program designated to run in a kernel space;
    determining, by a processing device of the computing system, that the source code package of the first program includes source code of a second program designated to run in a user space, the source code of the second program being identified by markers in the source code package of the first program, the first program and the second program being two functionally different programs;
    creating, from the source code of the first program, by a build manager on the computing system, a build-result package of the first program using disabled markers associated with the second program in the source code package of the first program, the build-result package of the first program to run in the kernel space; and
    creating, from the source code of the first program, by the build manager, a build-result package of the second program using enabled markers associated with the second program in the source code package of the first program, the build-result package of the second program to run in the user space, wherein the build-result package of the first program and the build-result package of the second program are executable by the processing device independent of each other.

11. The computer readable storage medium of claim 10 wherein the first program is a kernel-based virtual machine (KVM) program, and the second program is a quick emulator (QEMU) program.

* * * * *